UNITED STATES PATENT OFFICE.

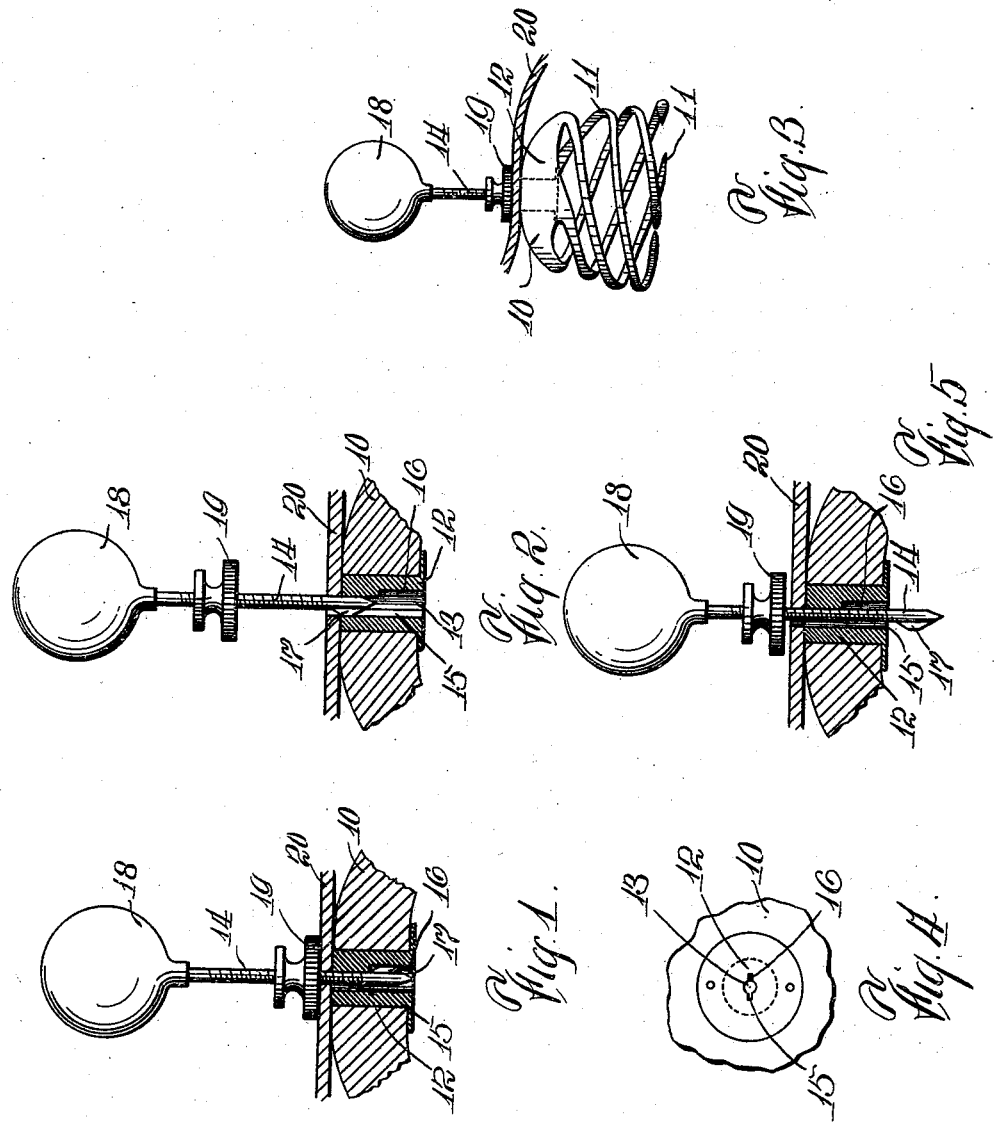

JOHN P. BARTOS, OF PINE CITY, MINNESOTA.

HAT-FASTENER.

966,516.　　　　Specification of Letters Patent.　Patented Aug. 9, 1910.

Application filed October 9, 1909. Serial No. 521,897.

*To all whom it may concern:*

Be it known that I, JOHN P. BARTOS, of Pine City, Pine county, Minnesota, have invented a new and useful Improvement in Hat-Fasteners, of which the following is a full, clear, and exact description.

My invention relates to improvements in hat fasteners and especially to devices of this character which are applicable to ladies' hats to fasten them to the hair of the head.

The object of my invention is to produce a simple and easily operated device which can be made highly ornamental if desired, and which can be applied to a lady's hat so that by giving the outer portion of the fastener a turn, an inner clutch will securely engage the hair and fasten the hat thereto, and by a reverse motion the hat can be released.

My invention also comprises a handle or shank separable from the inner clutch so that it can be readily pushed through a hat as illustrated in the sketch, and as readily released, and further to provide such a connection between the shank and clutch as will permit the clutch to turn with the shank although the two can be readily unlocked, all to the end that the device can be easily worked and at the same time made secure.

Reference is to be had to the accompanying drawings forming a part of this specification, in which similar reference characters indicate corresponding parts in all the views.

Figure 1 is a sectional elevation of the device embodying my invention, showing the clutch and handle in locked position. Fig. 2 is a similar view, but showing the handle or shank as it is being thrust through the hat shell into the clutch. Fig. 3 is a side elevation of the device as applied to a hat. Fig. 4 is an inside elevation in detail of a part of the clutch, and Fig. 5 is a sectional elevation showing the shank thrust in through the ferrule of the clutch in position to be turned for reëngagement with the clutch.

The clutch 10 is the part which engages the hair and comes inside the hat, and this can be made of tortoise shell, celluloid, or any suitable material, and it has a plurality of spiral fingers 11 so that when turned in one direction these fingers will enter the hair, and when turned in the opposite direction they will be released from the hair. The clutch is provided with a central ferrule 12 having a bore 13 therethrough which receives the screw shank 14, the latter being provided with a point so that it can be thrust through a hat shell 20 and into the ferrule, and the latter is provided with keyways 15 and 16, the former extending entirely through the ferrule and the latter extending partially through from the inner side, these keyways being for the purpose of engaging a bit 17 on the shank 14, so that the shank can be pushed through the hat shell and through the ferrule when the bit 17 is in engagement with the keyway 15, and when the bit has pushed through out of engagement with the keyway to the position shown in Fig. 5, then the shank can be turned so as to bring the bit into engagement with the keyway 16 and pulled back to the position shown in Fig. 1, in which position the shank or handle 14 is securely locked to the ferrule 12 and clutch 10 so that the parts will all turn together.

The shank 14 is provided with a head 18 which can be made ornamental after the manner of ordinary hat pins, and the shank carries a nut or bur 19 which can be readily adjusted, and to this end the thread of the screw and bur should be of a rather steep pitch.

When the shank 14 has been thrust through the ferrule 12 and pulled back to the position shown in Fig. 1 as already described, then the nut 19 can be screwed down so as to come in contact with the hat 20, and this prevents the shank and clutch from separating.

In practice at least two of these devices would be applied to a hat, preferably on opposite sides, and the wearer would grasp the head 18 and turn the two clutches 10 so as to have them engage the hair, thus locking the hat in position, and when the hat is to be released, the clutches can be turned in the opposite direction.

In the drawings I have shown a separate ferrule 12 on the clutch 10, but it will of course be understood that the bore and keyways might as well be produced in the clutch itself, if the latter were of the right material.

It will be seen that the device can be easily applied to a hat and readily operated, as well as readily adjusted, but after the fasteners are once adjusted on the hat they need not be changed.

Having thus fully described my invention, I claim as new and desire to secure by Letters Patent:—

1. A hat fastener comprising a clutch to go inside a hat and provided with a bore having keyways in the walls thereof, a shank to pierce the hat from the outside, said shank having a bit thereon to engage the aforesaid keyways, and means for locking the shank to prevent longitudinal movement through the clutch.

2. A hat fastener comprising a clutch adapted to go inside a hat and engage the latter, said clutch having a ferrule with keyways therein, a shank adapted to pierce the hat from the outside and having a bit to engage the keyways of the clutch, and means for fixing the position of the shank in the ferrule.

3. A hat fastener comprising a clutch to go inside the hat, said clutch having a bore with keyways in the walls thereof, one keyway extending entirely through and the other partially through the clutch, a shank to pierce the hat from the outside, said shank having a bit to engage the keyways, and a nut on the shank to fix its position.

4. A hat fastener comprising a clutch having a bore therein with keyways in the walls of the bore, a pointed and screw threaded shank to pierce the hat from the outside and provided with a bit to engage the keyways, and a nut on the shank.

5. A hat fastener comprising a clutch to fit inside a hat, said clutch having a ferrule with a longitudinal bore therein, and keyways in the walls of the bore, one extending entirely through the ferrule and the other extending partially through from the inner side, a pointed and screw threaded shank to pierce the hat from the outside and enter the bore, said shank having a bit to engage the aforesaid keyways, and a nut on the shank.

JOHN P. BARTOS.

Witnesses:
 WILLIAM VESELY,
 FRANK STISBA.